Feb. 10, 1925.
C. C. FARMER
SAND CONTROLLING DEVICE
Filed April 28, 1924
1,525,574
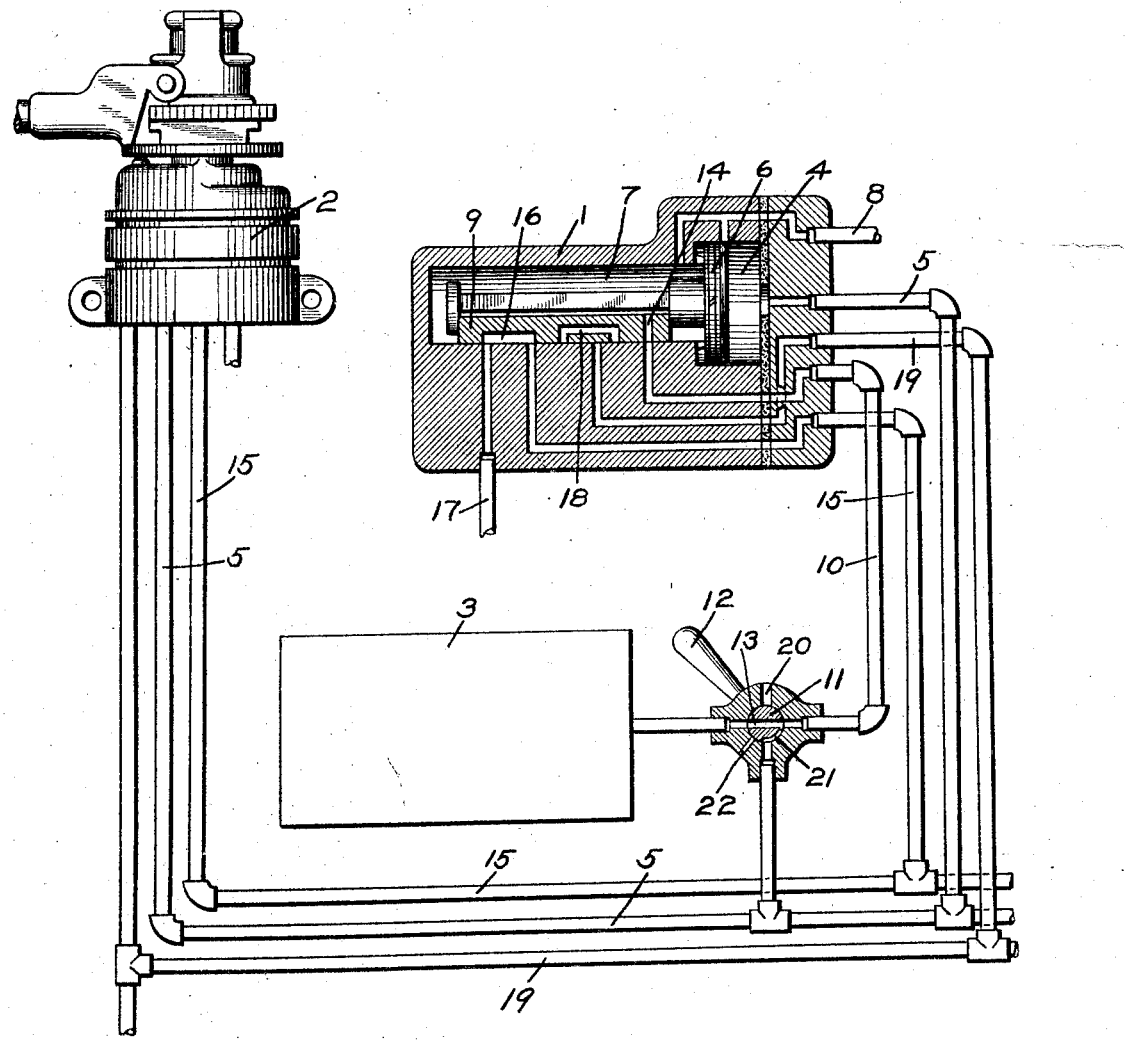
INVENTOR
CLYDE C. FARMER
BY Wm. M. Cady
ATTORNEY Patented Feb. 10, 1925.

1,525,574

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAND-CONTROLLING DEVICE.

Application filed April 28, 1924. Serial No. 709,345.

*To all whom it may concern:*

Be it known that I, CLYDE C. FARMER, a citizen of the United States, residing at Pittsburgh, in the county of Allegheny and State of Pennsylvania, have invented new and useful Improvements in Sand-Controlling Devices, of which the following is a specification.

This invention relates to fluid pressure brake equipments having means for sanding the rails when the brakes are applied.

With an equipment of the above character when a car is laid up in a barn or yard, the brake controlling parts are liable to move to emergency position through leakage of fluid under pressure from the emergency brake pipe and this will cause sand to be applied to the rails when not required.

The principal object of my invention is to provide means for preventing the waste of sand under the above conditions.

In the accompanying drawing, the single figure is a diagrammatic view of a fluid pressure brake and sand controlling equipment embodying my invention.

As shown in the drawing, the equipment may comprise an emergency valve device 1, a brake valve device 2, and a sanding reservoir 3.

The emergency valve device 1 may comprise a casing having a piston chamber 4, connected to emergency brake pipe 5 and containing piston 6, and a valve chamber 7, connected by pipe 8 to a source of fluid under pressure and containing slide valve 9.

The sanding reservoir 3 is connected by pipe 10 to the seat of slide valve 9 and interposed in pipe 10, in accordance with my invention is a cock 11 having an operating handle 12. Normally the handle 12 is in the position shown in the drawing, in which communication is established through the pipe 10, by way of a port 13.

In operation, in release position of the emergency valve device 1, as shown in the drawing, a port 14 through slide valve 9, registers with pipe 10, so that the sanding reservoir 3 will be charged with fluid under pressure from valve chamber 7.

The usual straight air pipe 15 is connected, through cavity 16 in slide valve 9 with pipe 17, leading to the usual brake cylinder (not shown), so that the brakes are released through the brake valve device 2, in the usual manner.

When it is desired to effect an emergency application of the brakes, the pressure in the emergency brake pipe is reduced, causing the movement of piston 6 and slide valve 9 to emergency position. In this position, fluid under pressure is supplied from valve chamber 7 to pipe 17 and the brake cylinder to effect an emergency application of the brakes and cavity 18 in slide valve 9 connects pipe 15 with pipe 19.

Fluid under pressure is thus supplied from the sand reservoir 3 to pipe 19, which is connected to the usual valve device, the operation of which by fluid under pressure is adapted to supply sand to the rails.

When the car is placed in a barn or a yard, in order to prevent waste of sand, the cock handle 12 is turned, so that the cock 11 cuts off communication through pipe 10, and at the same time, the port 13 in the cock connects the emergency brake pipe 5 to an exhaust port 20. The sand reservoir is also relieved of pressure by way of cavity 21 in the cock, which connects the reservoir in this position, with an atmospheric vent port 22.

It will now be seen that with the cock 11 in its cut-out position, fluid will not be supplied to pipe 19, even though the emergency piston 6 should move to emergency position.

The connection of the brake pipe to the atmosphere, in the cut-out position of the cock 11 is for the purpose of preventing the starting of the car until the cock 11 has been returned to its normal position, since if the usual compressor is started and fluid pressure is raised in the valve chamber 7, the emergency valve device being held in emergency position, due to the brake pipe being open to the exhaust port 20, the brakes will be applied by the admission of fluid under pressure from valve chamber 7 to the brake cylinder pipe 17. It is therefore evident that the handle 12 must be returned to its normal position before the car can be started.

Means are provided for venting the sand reservoir 3 when the cock 11 is turned to its cut-out position, so that when the cock is again turned to its open position, the rails will not be sanded by the admission of fluid from the reservoir to the sanding pipe 19 in case the emergency valve is in emergency position, as would occur when a car is taken out of the barn or yard.

Having now described my invention, what I claim as new and desire to secure by Letters Patent, is:—

1. The combination with a brake pipe and a valve device operated upon a reduction in brake pipe pressure for effecting an application of the brakes, of a reservoir normally charged with fluid under pressure, fluid from which is supplied to effect the sanding of the rails upon movement of said valve device to brake applied position, and a manually controlled valve operable to cut off communication through which fluid under pressure is supplied from said reservoir to said valve device.

2. The combination with a brake pipe and a valve device operated upon a reduction in brake pipe pressure for effecting an application of the brakes, of a reservoir normally charged with fluid under pressure, fluid from which is supplied to effect the sanding of the rails upon movement of said valve device to brake applied position, and a manually controlled valve operable to cut off communication through which fluid under pressure is supplied from said reservoir to said valve device and adapted in the cut off position to connect said brake pipe with an exhaust.

3. The combination with a brake pipe and a valve device operated upon a reduction in brake pipe pressure for effecting an application of the brakes, of a reservoir normally charged with fluid under pressure, fluid from which is supplied to effect the sanding of the rails upon movement of said valve device to brake applied position, and a manually controlled valve operable to cut off communication through which fluid under pressure is supplied from said reservoir to said valve device and adapted in the cut off position to vent fluid from said reservoir.

4. The combination with a brake pipe and a valve device operated upon a reduction in brake pipe pressure for effecting an application of the brakes, of a reservoir normally charged with fluid under pressure, fluid from which is supplied to effect the sanding of the rails upon movement of said valve device to brake applied position, and a manually controlled valve operable to cut off communication through which fluid under pressure is supplied from said reservoir to said valve device and adapted in the cut off position to vent fluid from said reservoir and to connect said brake pipe with an atmospheric exhaust.

In testimony whereof I have hereunto set my hand.

CLYDE C. FARMER.